March 15, 1966 D. D. HENDERSON 3,240,465
APPARATUS FOR MEASURING BELT SECTIONS
Filed Sept. 28, 1962 2 Sheets-Sheet 1
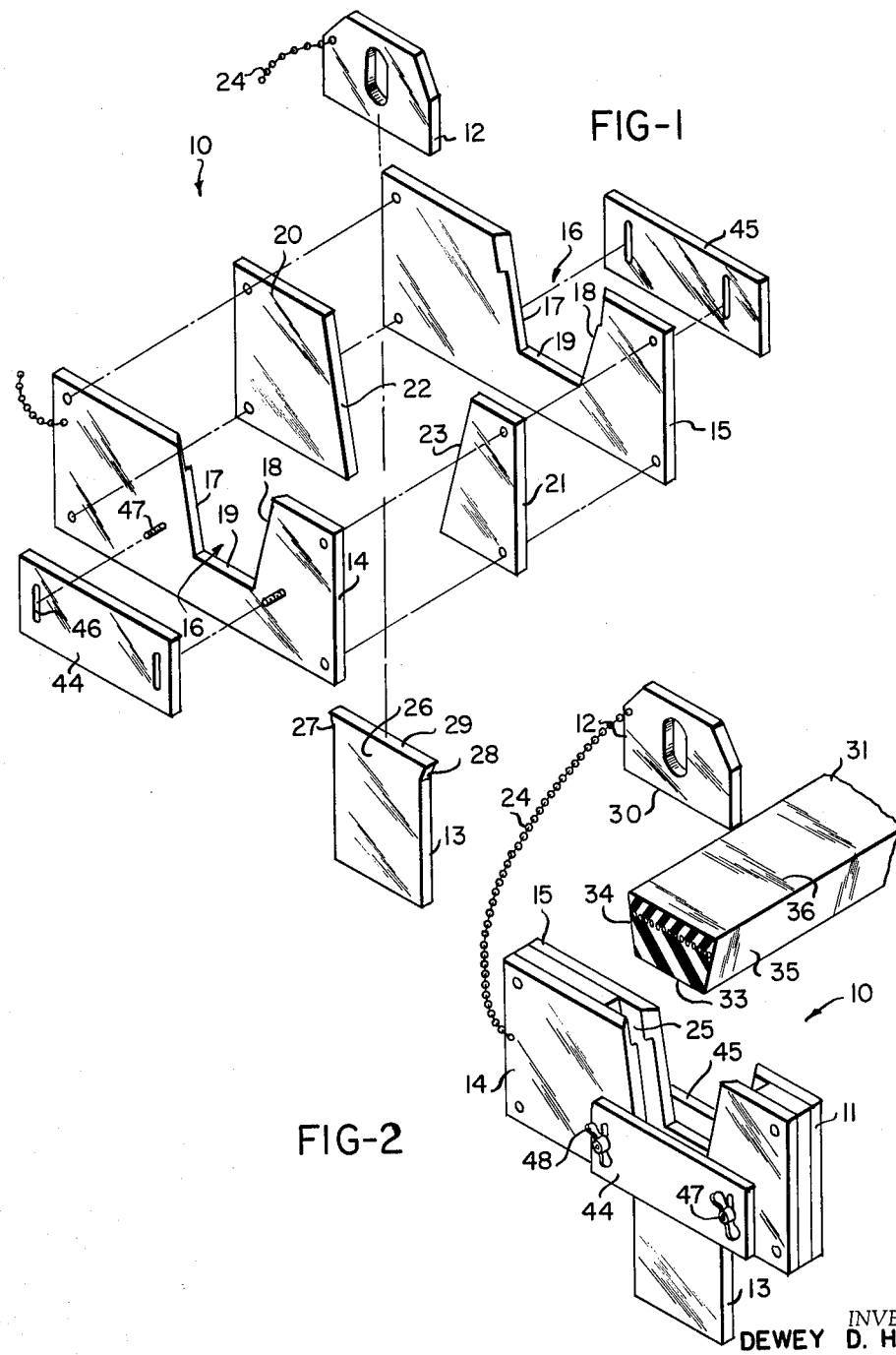
INVENTOR.
DEWEY D. HENDERSON
BY Reuben Wolk
ATTORNEY March 15, 1966     D. D. HENDERSON     3,240,465
APPARATUS FOR MEASURING BELT SECTIONS
Filed Sept. 28, 1962     2 Sheets-Sheet 2
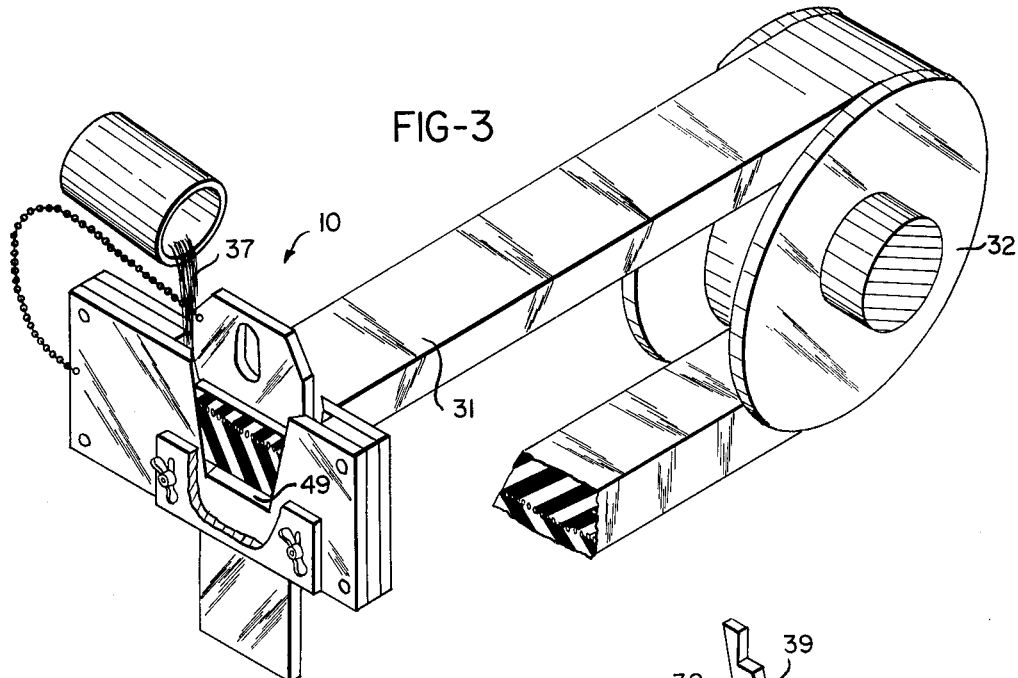
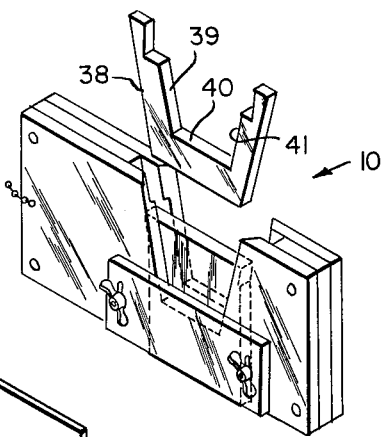
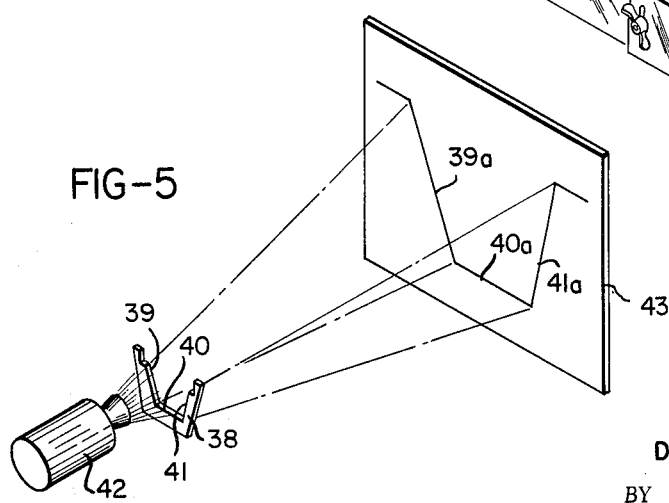
INVENTOR.
DEWEY D. HENDERSON
BY
Reuben Wolk
ATTORNEY United States Patent Office 3,240,465
Patented Mar. 15, 1966

3,240,465
APPARATUS FOR MEASURING BELT SECTIONS
Dewey D. Henderson, Springfield, Mo., assignor to Dayco Corporation, Dayton, Ohio, a corporation of Ohio
Filed Sept. 28, 1962, Ser. No. 226,815
4 Claims. (Cl. 249—136)

This invention relates to an improved apparatus for measuring the cross section of a transmission belt, as well as to an improved impression of at least part of the periphery of the belt.

It is well known that V-type transmission belts have opposed tapering side walls which are gradually worn away as the transmission belts continually pass around pulleys. It is desirable to determine the wear patterns in the belts, as well as the relationship of the side walls of the belts and pulleys. A measurement of the cross section of the belt for these purposes is desirable. Prior to the teachings of this invention, the only known way of obtaining such measurements was to cut such transmission belts in half and meausre one of its cut ends, destroying the usefulness of the belt.

However, according to the teachings of this invention, a true and accurate measurement of the cross section of the transmission belt can be obtained without removing the transmission belt from its pulleys or cutting open the same whereby the usefulness of the belt remains unimpaired while the wear characteristics are being determined. In particular, this invention provides an improved apparatus for obtaining an impression of the cross section of the belt while it remains mounted on the pulleys.

One embodiment of this invention for accomplishing the above feature comprises a mold device adapted to receive the transmission belt in a slot, the mold device having a mold cavity at least partially surrounding the received transmission belt whereby mold material can be disposed in the mold cavity and form an impression of at least part of the periphery of the belt. Thereafter, the impression can be removed from the mold device and can be utilized to determine the actual periphery at the cross section of the transmission belt without requiring the belt to be cut open. For example, the impression can be utilized to produce a shadowgraph that can be subsequently utilized to determine what changes in belt characteristics may be made to improve wear, or to indicate the need for different pulleys.

Therefore, it is an object of this invention to provide an improved apparatus for measuring the cross section of a transmission belt, the apparatus having one or more of the novel features set forth above or hereinafter shown or described.

A further object of this invention is to provide an improved impression of the cross section periphery of a transmission belt, the impression having one or more of the novel features of this invention set forth above or hereinafter shown or described.

Other objects, uses and advantages of this invention are apparent from a reading of this description which proceeds with reference to the accompanying drawings forming a part thereof and wherein:

FIGURE 1 is an exploded perspective view of the improved apparatus of this invention.

FIGURE 2 is a perspective view of the apparatus illustrated in FIGURE 1 indicating the method of utilization.

FIGURE 3 is a view similar to FIGURE 2 illustrating another step of the method of this invention.

FIGURE 4 is a view similar to FIGURE 1 illustrating the method of removing the transmission belt impression from the mold apparatus of this invention.

FIGURE 5 is a schematic perspective view illustrating one method of utilizing the impression of this invention for measuring the cross section of a transmission belt.

While the various features of this invention are hereinafter described and illustrated as being particularly adaptable for measuring the cross section of a belt, it is to be understood that the various features of this invention can be utilized singly or in any combination thereof to measure the cross section of other products. Therefore, this invention is not to be limited to only the embodiments illustrated in the drawings, because the drawings are merely utilized to illustrate one of the wide variety of uses of this invention.

Referring now to FIGURES 1 and 2, the improved apparatus of this invention is generally indicated by the reference numeral 10 and comprises a mold housing 11, a removable upper member 12 which is secured to the mold housing by means of a chain 24, and a lower member 13 that is movable relative to the housing member 11 for a purpose hereinafter described. The housing 11 is formed from a pair of identical plates 14 and 15 having a notch or slot 16 defined by opposed converging side walls 17 and 18 and a bottom wall 19, the notches adapted to register with each other when the plates 14 and 15 are assembled in a manner hereinafter described. The plates 14 and 15 are adapted to be spaced from each other by a pair of flat spacing plates 20 and 21 having converging surfaces 22 and 23. A pair of end plates 44 and 45 having slots 46 located therein, are adapted to be mounted on studs 47 which are attached to plates 14 and 15 by means of wing nuts 48.

As illustrated in FIGURES 1 and 2, the plates 14 and 15 are assembled together with the spacer plates 20 and 21 disposed therebetween, the plates 14, 15, 20 and 21 being secured together by rivets, screws or the like. The surfaces 22 and 23 of the spacer plates 20 and 21 are spaced outwardly from the walls 17 and 18 of the plates 14 and 15 to define an upwardly divergent mold cavity 25 between the plates 14 and 15. The movable member 13 of the apparatus 10 is substantially rectangular, and has an upper end 26 provided with upwardly divergent side walls 27 and 28 which are adapted to respectively engage the edges 22 and 23 of the spacer plates 20 and 21 when the member 13 is inserted vertically downwardly in the housing member in the manner illustrated in FIGURE 1, the member 13 being held in the position illustrated in FIGURE 1 by gravity but being adapted to be removed upwardly from that position for a purpose hereinafter described. When the member 13 is disposed in the position illustrated in FIGURE 1, it can be seen that the upper edge 29 thereof is spaced below the bottom walls 19 of the front and back plates 14 and 15 and cooperates with the side edges 22 and 23 of the spacer plates 20 and 21 to define the mold cavity 25 that surrounds the notch 16. The removable member 12 of the apparatus 10 has a substantially straight bottom edge 30 and has such a width to permit the same to be transversely received in the mold cavity 25 in the manner illustrated in FIGURE 3 while still permitting access to the upper open ends of the cavity 25 on each side of the removable member 12 for a purpose hereinafter described.

Operation of the apparatus

As illustrated in FIGURES 2 and 3, a substantially V-shaped transmission belt 31 is mounted on pulley 32. It is desired to measure the cross section of the belt without removing it from the pulley or cutting the same open as in the prior known methods. The removable member 12 of the apparatus 10 is removed from housing 11, the chain 24 securing it against loss or misplacement. The sides 34 and 35 of the belt will become wedged against the side walls 17 and 18 of the plates 14 and 15, which creates a small gap 49 between the lower surface 33 of the belt and the bottom walls 19 of the plates 14 and 15, as shown in FIGURE 3. The purpose of end plates 44 and 45 is now apparent; they create a dam or closure for the gap 49 so that the mold cavity is completely closed off. These end plates are adjustably located with respect to plates 14 and 15 by means of the slots 46 which fit over studs 47, and are retained by means of the wing nuts 48.

The housing 11 is placed around the belt 31 as shown in FIGURE 3, and the removable member 12 is inserted vertically downward into the mold cavity 25 until the bottom edge 30 thereof rests on the top edge 36 of the belt.

With the apparatus arranged as shown in FIGURE 3, mold material 37, which is in liquid form, is poured into the mold cavity 25 to provide an impression 38 of a portion of the cross section of the belt. The mold material is preferably some type of low melting point metal alloy, such as a eutectic alloy of bismuth, lead, cadmium or indium which has these low melting characteristics. The preferred metal is bismuth, which can be alloyed to provide a material melting at about 117° F., and which further expands about three percent on solidifying. This desirable property permits an accurate pattern. Because of this low melting point, any operator in the field can melt the alloy in boiling water before pouring, this tending to simplify handling problems.

It should be noted that certain other materials, such as epoxy resins, can also be used for the purposes of the invention. Such a material is originally supplied in liquid form and no melting step is required.

When the mold material is poured, it flows around the belt and forms an impression of the sides and bottom. It is only necessary to allow it to stand for about five minutes before it hardens to form the permanent pattern which is desired. After the mold material 37 has solidified in the mold cavity 25, the member 12 is removed from the housing member 11 whereby the housing 11 can be removed from the transmission belt by vertically lowering the housing relative to the belt. Thereafter, the impression 38 can be removed from the housing member 11 by moving the member 13 upwardly whereby the upper edge 29 of the member 13 pushes the impression from the mold cavity 25.

As illustrated in FIGURES 4 and 5, the impression 38 has surfaces 39, 40 and 41 which conform to the bottom and sides of the belt. The remaining portions and segments of the impression have no purpose beyond the structural relationship involved. In this manner, it can be seen that substantially the entire cross section of the transmission belt 31 is provided by the impression 38 without requiring removal of the belt from pulley 32, or cutting of the belt. The impression 38 can be utilized in any suitable manner to determine the wear of the sides of the belt to determine what changes should be made in the belt or pulley to compensate for such wear. For example, when the belt 31 is new, an impression may be made in the above manner; thereafter, additional impressions may be made during subsequent time intervals of use, whereby the changes in the impressions are measured to determine the belt wear and necessary changes in the belt or pulley. If desired, the impression may be shadowgraphed in the manner illustrated in FIGURE 5 by passing light from a light source 42 against the impression 38 to cast a shadow on screen 43 to provide an enlarged picture which may be traced. It is understood, of course, that other methods of utilizing the impression are possible; for example, direct measurements may be scaled therefrom. Additional useful information may be obtained by measurement of the section at different places along the belt, thus providing an indication of consistency of wear during the belt travel.

It can be seen that this invention provides an improved apparatus for measuring the actual cross section of a transmission belt without requiring removal of the transmission belt from its drive and driven means and without the requiring of the belt to be cut open as in the past. Further, this invention provides an improved impression of such a cross section. Other forms of the apparatus are contemplated as being within the scope of the invention. For example, the end plates 44 and 45 may be omitted and clay used to dam the edges of the cavity. Still other changes may be made without departing from the spirit of the invention.

I claim:

1. Apparatus for measuring the cross section of a transmission belt comprising a mold having slot means for receiving said belt and having a mold cavity at least partially surrounding said belt, said mold cavity formed by a plurality of members and adapted to receive mold material forming an impression of at least part of the periphery of said belt, one of said members movable relative to said mold and forcing said impression from said mold cavity.

2. Apparatus for measuring the cross section of a transmission belt comprising a mold having a notch for receiving said belt and a mold cavity surrounding a portion of said belt, said mold cavity defined by a first member and a second member engaging said belt, said mold cavity being adapted to receive mold material to form an impression of part of the cross section of said belt, said second member removable from said mold to permit said belt to be removed from said notch after said impression has been formed and said first member movable relative to said mold and forcing said impression from said mold cavity.

3. Apparatus for measuring the cross section of a V-shaped transmission belt comprising a mold having a substantially V-shaped notch for receiving said belt and a substantially V-shaped mold cavity surrounding a portion of said belt, said mold cavity partially defined by a first member normally forming an inner surface wall of said mold cavity spaced from the bottom of said belt, said mold cavity partially defined by a second member engaging the outer surface of said belt, said mold cavity being adapted to receive mold material to form an impression of part of the periphery of said belt, said second member removable from said mold to permit said belt to be removed from said notch after said impression has been made, said first member movable relative to said mold and forcing said impression from said mold cavity.

4. Apparatus for measuring the cross section of a V-shaped transmission belt comprising a mold having a substantially V-shaped notch for receiving said belt and a substantially V-shaped mold cavity surrounding a portion of said belt; said mold cavity defined by a lower member forming the bottom wall of said cavity and spaced from the inner surface of said belt, a pair of side plates having notches defined therein and adapted to register with each other when assembled, a pair of spacing plates separating said side plates for defining the sides of said mold cavity, and a pair of end plates mounted on said side plates and supporting the inner surface of the belt when placed in said apparatus, and an upper member fitting partially between said side plates and resting upon the outer surface of said belt when in said apparatus.

(References on following page)

References Cited by the Examiner

UNITED STATES PATENTS

| | | | |
|---|---|---|---|
| 2,308,046 | 1/1943 | Bishman et al. | 18—34 |
| 2,317,925 | 4/1943 | Lewis | 33—174 |
| 2,357,998 | 9/1944 | Campbell | 25—127 XR |
| 2,422,266 | 6/1947 | Steinke | 18—36 XR |
| 2,439,724 | 4/1948 | Finley | 25—118 |
| 2,524,737 | 10/1950 | Sawyer | 18—34 |
| 2,601,703 | 7/1952 | Sawyer | 264—40 |
| 2,650,410 | 9/1953 | Mitchell | 25—131 |
| 2,682,111 | 6/1954 | Kish | 33—174 |
| 2,886,852 | 5/1959 | Rose | 264—318 |

J. SPENCER OVERHOLSER, *Primary Examiner.*

ALEXANDER H. BRODMERKEL, WILLIAM J. STEPHENSON, *Examiners.*